Figure 1:
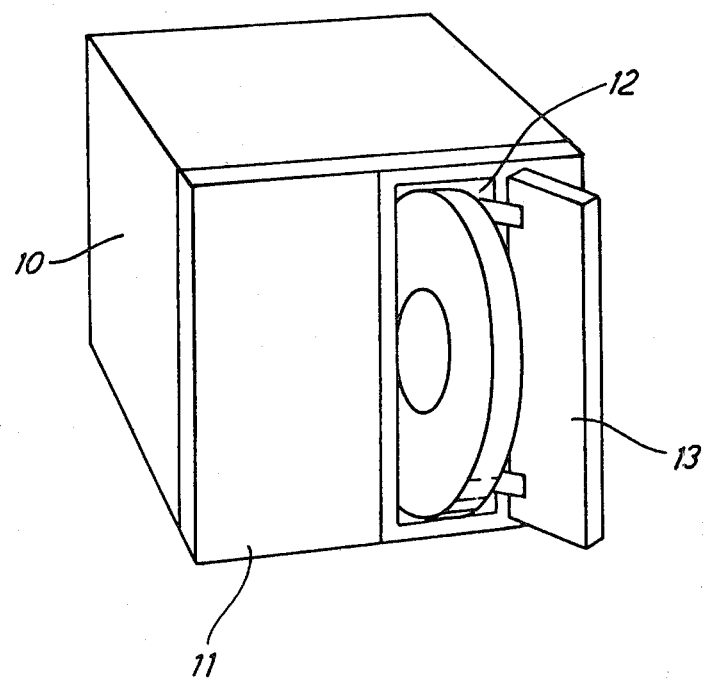

United States Patent [19]

Knott

[11] 4,456,191

[45] Jun. 26, 1984

[54] SPOOL MOUNTING APPARATUS

[75] Inventor: John Knott, Wells, England

[73] Assignee: EMI Limited, Hayes, England

[21] Appl. No.: 311,019

[22] Filed: Oct. 13, 1981

[30] Foreign Application Priority Data

Oct. 15, 1980 [GB] United Kingdom ............. 8033295

[51] Int. Cl.³ ................. G03B 1/04; G11B 15/32; G11B 23/10
[52] U.S. Cl. ................... 242/68.1; 242/182; 242/192; 360/93
[58] Field of Search .............. 242/182, 198, 199, 200, 242/68.1, 192; 360/93, 94, 132, 134

[56] References Cited

U.S. PATENT DOCUMENTS

| 3,043,533 | 7/1962 | Faulkner et al. | |
|---|---|---|---|
| 3,273,815 | 9/1966 | Schuller | 242/198 |
| 3,635,424 | 1/1972 | Morello et al. | 242/198 |
| 3,807,651 | 4/1974 | Furst | |
| 4,054,923 | 10/1977 | Lewis | |
| 4,234,140 | 11/1980 | Van Nie et al. | 242/199 |

FOREIGN PATENT DOCUMENTS 1153709  5/1969 United Kingdom .
1410601 10/1975 United Kingdom .

OTHER PUBLICATIONS

"Tape Reel Latch", by R. P. Crawford and P. A. Gilovich, IBM Technical Disclosure Bulletin, vol. 20, No. 10, Mar. 1978, p. 4112.

Primary Examiner—Stuart Levy
Assistant Examiner—Lloyd D. Doigan
Attorney, Agent, or Firm—Fleit, Jacobson, Cohn & Price

[57] ABSTRACT

A spool mounting apparatus, particularly suitable for automatic, unbuffered tape transport systems, permits a reduction in the handling of spools during loading sequences.

A spool inserted through an opening into a cavity within a housing, is guided into a preliminary position by a detent pin. The opening possesses a spring biassed closure member, which is mechanically linked to a free running disc member within the cavity situated opposite a shaped cylindrical hub over which the spool may locate.

Motion of the spring biassed closure member towards a closed position effects displacement of the free running disc member towards the hub, thereby clamping the spool disposed therebetween. Subsequent rotation applied to the hub is therefore transferred to the clamped spool and the free running member.

6 Claims, 7 Drawing Figures

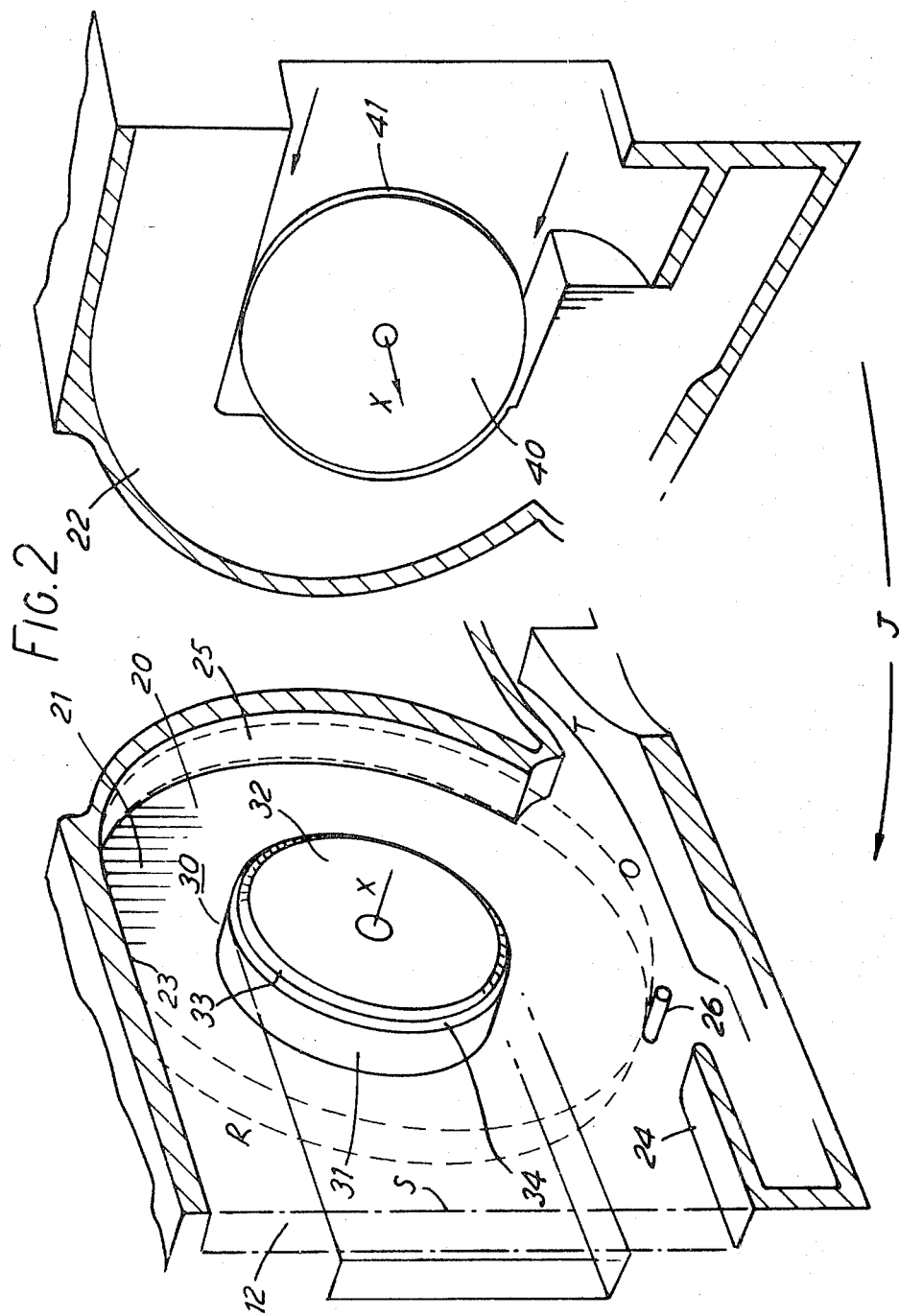

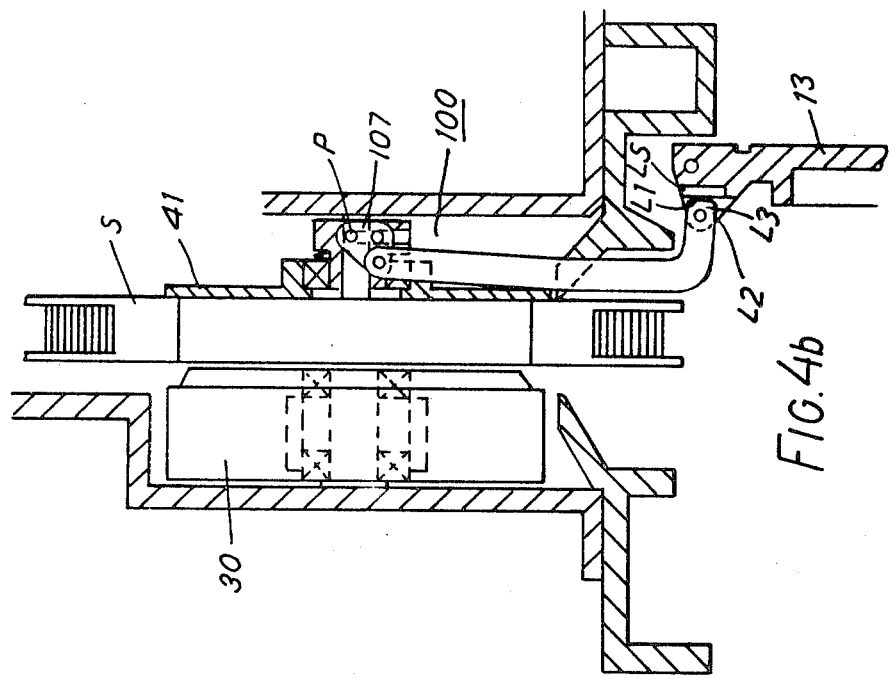
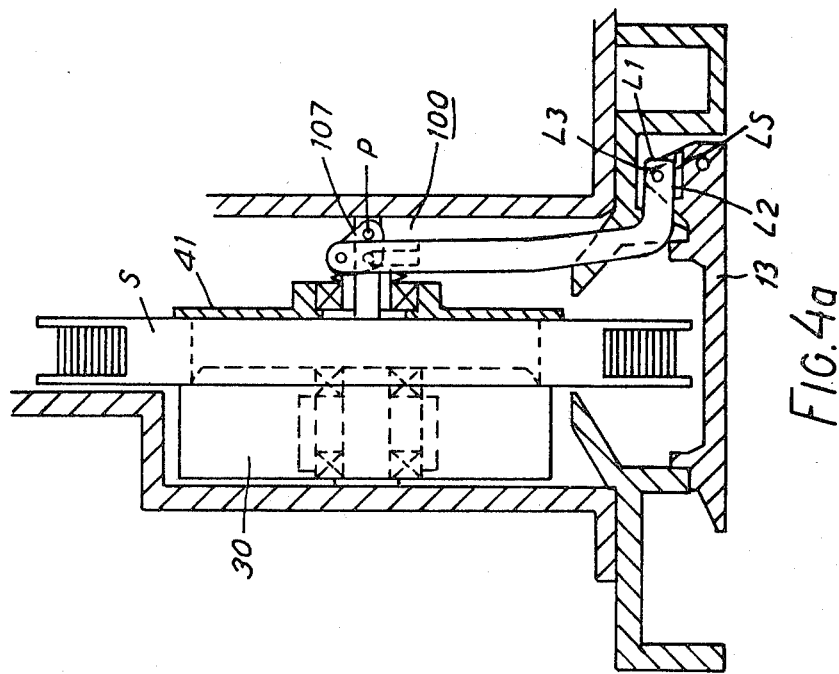

SPOOL MOUNTING APPARATUS

This invention relates to a spool mounting apparatus and especially, although not exclusively, it relates to an apparatus for mounting a spool of the kind used for supporting magnetic recording tape.

Capstanless, unbuffered tape transports are known in which magnetic tape is threaded from one spool to another by the action of a continuous air stream prevailing between the compartments accommodating the spools. This arrangement ensures that threading is achieved relatively quickly and, as such, is particularly suitable for use in conjunction with computer peripherals, for example disc drives.

Whilst the above-described arrangement requires little handling of the spools, hitherto, it has often been necessary to locate a spool manually over a hub, a procedure which can be tedious and time consuming.

It is an object of the present invention therefore to provide an improved spool mounting apparatus.

According to the invention there is provided a spool mounting apparatus comprising a housing having an opening to a cavity for receiving a spool, means for closing the opening, and respective driving and driven members mounted within the cavity for rotation, characterized in that the driven member is capable of clamping a received spool against the driving member so as to effect rotation of the spool, and is coupled to the closure means in such a way that when said closure means approaches or assumes a closed condition, the clamping action of the driven member is effected.

Figure 3A:
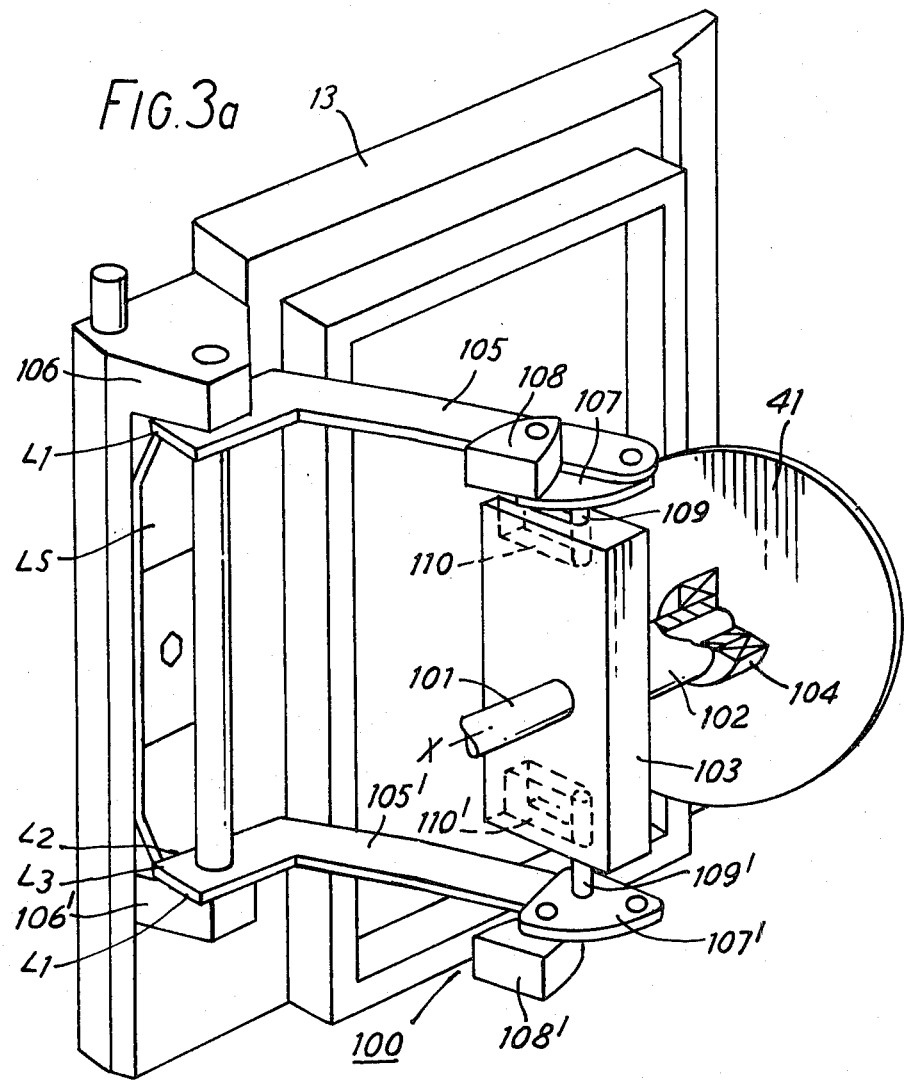
Figure 3B:
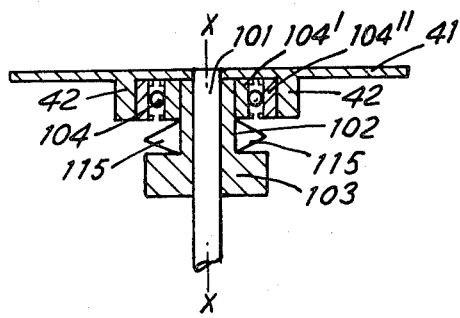

In order that the invention may be more readily understood, and carried into effect, one embodiment thereof is now described by way of example only, by reference to the accompanying drawings of which:

FIG. 1 shows the front perspective view of a unit accommodating the spool mounting apparatus of the present invention, FIG. 2 shows an exploded interior view of the unit and illustrates some of the constituent parts of the apparatus, FIG. 3a shows a schematic perspective view of the spool mounting apparatus, FIG. 3b shows a sectional view illustrating the mounting for a clamping device used in the apparatus and FIGS. 4a and 4b show horizontal sectional views of the apparatus, which are useful in understanding the mode of operation.

The unit shown in FIG. 1 comprises a generally rectangular housing 10 supporting a front panel 11 having a rectangular opening 12 through which a spool may be introduced for mounting. A hinged, external opening flap or door 13 is also provided for closing the opening 12 and, as will be described in greater detail below, this door also plays an important role in the spool mounting procedure itself.

As illustrated in the exploded view of FIG. 2, a spool introduced into the unit is accommodated within a relatively narrow cavity 20 bounded by a side wall 21, shown in the left hand part of the drawing, and a mutually parallel side wall 22, which is shown in the right hand part of the drawing and which defines the plane along which the drawing has been divided. It will be appreciated that in practice, in one example of the invention, the two parts of the drawing may represent separate castings which are joined together, as indicated by the arrow J, so that the hatched regions meet, thereby forming a unitary housing.

The position of the rectangular opening 12 is indicated by the chain-dotted outline S and respective upper and lower cavity walls 23, 24 extend rearwardly from the upper and lower edges of the opening. The lower wall 24 extends part way only into the cavity, but the upper wall 23 is sufficiently extensive to join an arcuate rear wall 25, lying opposite the opening 12 and having a curvature chosen to substantially match that of the largest spool which the opening 12 is dimensioned to receive—in this example a 7" diameter spool.

As illustrated by the broken outline R in FIG. 2, a spool introduced into the cavity is supported against the rear wall 25 by a cylindrical detent pin 26 extending between the side walls 21 and 22. This pin is located slightly above the plane of the lower wall 24 thereby tending to obstruct a spool as it enters the cavity and so providing for its controlled insertion.

The pin 26 and the lower part of the rear wall 25 locate a spool between opposed mounting members 30 and 40 which are supported for rotation, about a common axis X, within respective recesses in the side walls 21 and 22.

Member 30 comprises a cylindrical hub 31 which may be caused to rotate about the axis X by a motor driven belt (not shown in the drawing) with which it is frictionally engaged. The end face of the hub projects marginally beyond the side wall 21 and lies in a plane substantially parallel thereto. This end face also has a circular raised portion 32, having a bevelled edge 33 which meets the end face to define an annular ledge 34 whose internal diameter substantially equals that of the central aperture extending through a spool. A free running disc member 40 located on side wall 22 comprises a planar, free running disc 41 which, as will be described below, is adapted for movement to and fro along the axis X and, moreover, is capable of tilting slightly away from a plane perpendicular thereto.

The rear wall 25 of the cavity and the detent pin 26 are disposed to locate the spool so that its central axis lies along, or close to, the axis X so that a movement of the disc 41 towards the opposite wall of the cavity causes the spool to be located over the raised portion 32 of the mounting member 30. Further movement of the disc then causes the spool to be accurately located against the ledge 34 where it is firmly clamped and, if necessary, the spool is guided to this position by the bevelled edge of the central portion 32. Since, moreover, the disc is permitted to execute a slight rocking movement, full contact is maintained with the spool throughout the entire clamping procedure.

Once the spool has been clamped in position the member 30 may rotate and tape is guided through the opening O, between the lower and rear walls, along a narrow channel T for threading onto a receiving spool (not shown in the drawing), located towards the rear of the unit. For this purpose the tape is directed by a stream of air generated by a fan (not shown) which is incorporated in the body of the hub. For efficiency of threading it is preferable to develop a relatively high pressure within the cavity and so it is advantageous if the door 13 can effectively seal the opening 12 during a tape threading operation.

In this example of the invention, movement of the disc 41 along the axis X is effected by a movement of the door 13, so that a spool may be mounted and clamped in the above-described fashion, by moving the door from the open to the closed position. The mechanism whereby this movement may be achieved is illustrated by reference to FIGS. 3 and 4. In particular FIG. 3a shows a perspective view (not to scale) of the mechanism 100 which links the door, shown in rear view at 13, to the disc 41. It will be appreciated that FIG. 3a is schematic and the side wall 22, which is shown in FIG. 2, is not illustrated; a cylindrical rod, however, which is fixed to, and extends orthogonally from, the back face of the recess in wall 22 is shown at 101. This rod acts as a bearing for the clamping disc 41 and supports a closely fitting collar 102 and an integral, rectangular coupling member 103 which, as described below, can slide along the axis X of the rod in response to a displacement of the door 13. A ball race, shown schematically at 104, serves to mount the disc to the collar, and both the ball race and the collar are partly cut away in the drawing to reveal the underlying rod 101. This mounting arrangement is shown in greater detail in FIG. 3b which shows a sectional view in the horizontal plane which passes through the axis X of the rod 101 and bisects the coupling member 103. As shown in FIG. 3b each ball race 104 comprises respective inner and outer co-axial members 104', 104'' which are respectively, fixedly mounted to the collar 102 and an annular flange 42 extending from the back face of the disc 41. While this arrangement permits rotational movement of the disc in relation to the collar, it also ensures that axial movement of the collar caused by displacement of the door is transmitted to the disc. Since only one ball race is used the disc is permitted some movement out of the plane normal to the axis X of the rod 101, and a disc spring 115, acting between the ball race and the coupling member tends to resiliently bias the disc so as to maintain it in the normal plane. As described earlier, however, some movement of the disc is still possible and this assists in the mounting of a spool.

The door 13 is linked to the coupling member 103 by a pair of flat, elongate levers 105, 105' which are pivotally mounted, at one end, to respective projections 106, 106' of the door. Each lever is pivotally mounted at its other end to a respective bell crank 107, 107' which in turn is pivotally mounted to a respective block 108, 108', each block being secured within the recess in the side wall 22 (shown in FIG. 2). Each bell crank has a fixed pin 109, 109' which is located within a respective complementary slot 110, 110' in the coupling member. In this way displacement of the levers, due to movement of the door, causes rotation of each bell crank about its respective fixed pivot point which in turn causes the fixed pins 109, 109' to bear against one or the other side of their respective slots thereby effecting translation of the disc along the axis X. Operation of the above-described mechanism in the spool mounting procedure is illustrated by reference to FIGS. 4a and 4b which show sectional views in the horizontal plane bisecting the mounting apparatus i.e. the plane which passes through the centre of the spool mounting members 30 and 40. These Figures show the condition of the apparatus in two extreme positions, namely when the door 13 is fully closed and a spool S is clamped by disc 41 against the mounting member 30 (FIG. 4a) and when the door is fully open and the spool is unclamped (FIG. 4b). It will be noticed that by closing the door 13 the bell crank, shown at 107, rotates in a clockwise sense, about its fixed pivot point P, through an angle of about 90° and this movement urges the integral collar and coupling member 102, 103 along the bearing 101 towards the mounting member 30 thereby effecting a corresponding movement of disc 41.

In the two extreme positions of the door, namely the fully open and fully closed positions, the respective end and side portions, $L_1$ and $L_2$, of each lever 105, 105' lie adjacent to a resilient leaf spring (shown at LS in FIGS. 3 and 4) which assumes an unstressed condition. Movement of the door away from either of these extreme positions, however, causes the corner $L_3$ of each lever to move along an arcuate path so as to cause the strip LS to flex. Until, at an intermediate position of the door, the degree of flexing reaches a maximum the spring tends to urge the door back to its initial position, but as the intermediate position is passed the door is rapidly driven towards the other extreme position. Such a bistable arrangement is particularly suitable in the present arrangement since the door may either assume a fully open condition thereby allowing unhindered insertion of a spool, or, after application of a finite force, a fully closed condition which is maintained despite the use of the relatively high internal pressure described earlier.

The above-described arrangement, therefore, provides a convenient and reliable spool mounting arrangement which merely requires an operative to insert the spool through an opening in a housing and then close a door and while this arrangement is particularly suitable for use with the relatively small 7" diameter spools, larger (e.g. $10\frac{1}{2}$" diameter) spools could alternatively be accommodated.

It will be appreciated that whilst the above-described example relates to a particular mechanism and door the invention also encompasses alternative arrangements for closing the input aperture for a spool; a sliding door, or a drawer for example.

What I claim is:

1. A spool mounting apparatus comprising a housing having an opening to a cavity for receiving a spool, means for closing the opening, and respective driving and driven members mounted within the cavity for rotation, the driven member being capable of clamping a received spool against the driving member so as to effect rotation of the spool, and being coupled to the closure means in such a way that when said closure means approaches or assumes a closed condition, the clamping action of the driven member is effected, wherein said driven member comprises a free running disc member capable of movement along an axis substantially common in said closed condition, to an axis of said driving member, the disc member also having limited movement away from a plane perpendicular to said axis, wherein the cavity is defined by two substantially parallel side walls, an arcuate wall and said opening, and wherein projections of said closure means are pivotally mounted to levers pivotally mounted to bell cranks, the bell cranks being pivotally mounted to blocks secured in a side wall of said cavity, said bell cranks having fixed pin attachments slideably located within respective slots formed in a coupling member attached to said free running disc member, said coupling member acting on said disc member in response to rotation of said bell cranks resulting from displacement of said levers as a consequence of movement of said closure means, said rotation of said bell cranks causing said pin attachments to bear against one side of their respective slots, thereby effecting translation of said disc member along said common axis.

2. Apparatus according to claim 1 wherein the driving member comprises a motor driven cylindrical hub being axially substantially perpendicular to said cavity side walls and including an end face substantially parallel to said side walls.

3. Apparatus according to claim 2 wherein said end face is formed with a circular raised portion with a bevelled edge arranged to meet said end face to define an annular ledge.

4. Apparatus according to claim 1 wherein the closure means comprises a hinged external opening door.

5. Apparatus according to claim 1 wherein a resilient leaf spring disposed adjacent said levers is acted upon by, resisting movement by, said levers when said closure means is neither fully open nor fully closed.

6. A spool mounting apparatus comprising a housing provided with an opening into a cavity for accommodating a spool for mounting, and hinged closure means for closing said opening, said cavity being defined by first and second substantially parallel side walls and a rear wall, opposed mounting members being supported within said cavity for location of said spool therebetween, said cavity further including a detent pin for providing correct initial location of said spool between said mounting members, said mounting members consisting respectively of a motor-driven hub member and a free-running disc member both being adapted for rotation about a substantially common axis, said apparatus further comprising a mechanism for coupling said closure means to a substantially rigid rod member, said rod member being connected to said disc member and adapted to act as a bearing therefor, the longitudinal axis of sais rod member being substantially in alignment with said common axis, said mechanism and said rod member providing, in co-operation, translational movement of said disc member, upon closure of said closure means, substantially along said common axis in the direction of said hub member, so as to effect clamping of a substantial surface area of said spool when located between said hub member and said disc member.

* * * * *